July 6, 1965  W. GEFFCKEN  3,193,400
OPTICAL GLASS
Filed March 19, 1962
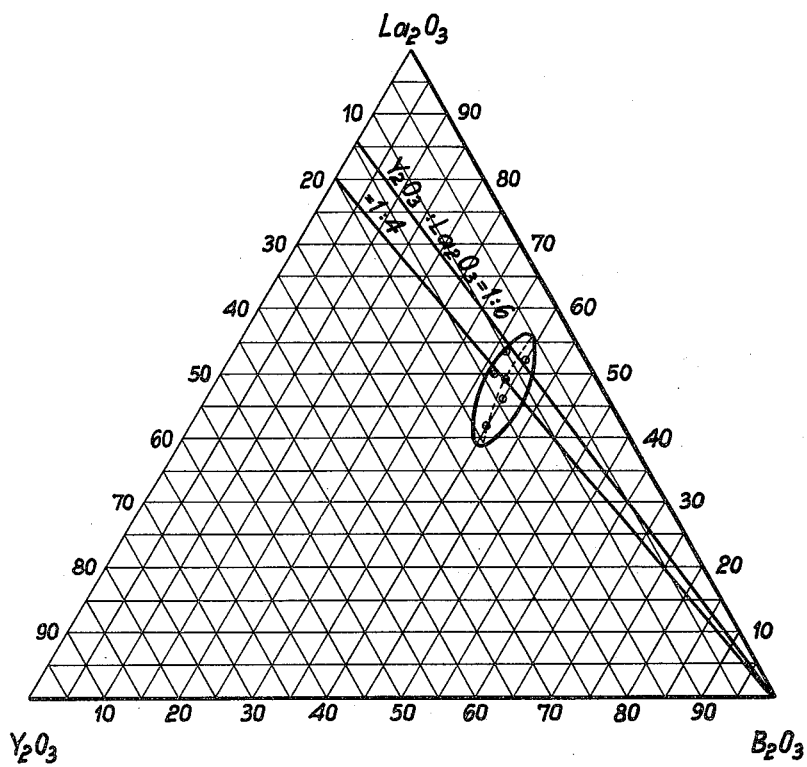
INVENTOR
WALTER GEFFCKEN

3,193,400
OPTICAL GLASS
Walter Geffcken, Mainz, Germany, assignor to Jenaer Glaswerk Schott & Gen., Mainz, Germany, a German corporation
Filed Mar. 19, 1962, Ser. No. 180,607
Claims priority, application Germany, Mar. 21, 1961, J 19,632
3 Claims. (Cl. 106—47)

This invention relates to an improved optical glass having an extremely high refractive index and Abbe value ($\nu$).

Optical glasses having high indexes of refraction ($n_d$) of 1.715 to 1.76 and high Abbe values ($\nu$) of about 55–57, ($n_d$ 1.725) whose main constituents are $La_2O_3$ and $B_2O_3$, are known. The use of $ThO_2$ was necessary in the production of these glasses and this presented a problem due to the safety measures required. Furthermore, the $La_2O_3$ content of these glass systems could not exceed about 55% without the crystallization tendency becoming too high. It was thus necessary to use other oxides, such as $ZrO_2$, $Ta_2O_5$, $Nb_2O_5$ or $CdO$ to maintain the high refractive index, but the use of these materials decreased the Abbe value. The glasses which solely contained the $La_2O_3$ and $B_2O_3$ were limited to a composition of 60% $La_2O_3$ and 40% $B_2O_3$, which however had a very high crystallization tendency.

One object of this invention is the production of an $La_2O_3$—$B_2O_3$ optical glass of high $n_d$ of 1.715–1.765 and $\nu$ values of 51–56 without the addition of $ThO_2$.

This and still further objects will become apparent from the following description.

In accordance with the invention it has been found that an optical glass with high $n_d$ and $\nu$ values may be obtained without the use of $ThO_2$ if, in addition to $La_2O_3$ and $B_2O_3$, $Y_2O_3$ is used.

While prior art glass compositions were known in which a portion of the $La_2O_3$ was replaced by $Y_2O_3$, glasses which essentially consisted solely of $B_2O_3$, $La_2O_3$, and $Y_2O_3$ were not known. The remainder if any consists of one or more oxides of the group of silica, alumina, high refracting oxides as $ZrO_2$, $Ta_2O_5$, $Nb_2O_5$, $CdO$, the sum of these oxides not exceeding 5% by weight.

While the glass range of this three-component system is small, stable compositions exist which reach refraction values up to 1.75. Since no further additives which will decrease the Abbe values are required, it is possible to simultaneously obtain high Abbe values of, for example, 53.5 for this refraction value.

The glass range for the three-component system is shown encircled on the three-component graph of the accompanying drawing, and the glass in accordance with the invention has contents of $La_2O_3$, $Y_2O_3$ and $B_2O_3$ falling within this encircled area on the graph. Preferably the glass composition in accordance with the invention is limited by the area defined by the following coordinates on the three-component graph of the accompanying drawing:

| $La_2O_3$, Weight Percent | $B_2O_3$, Weight Percent | Remainder |
|---|---|---|
| 40 | 39–41 | $Y_2O_3$ |
| 42 | 38–42.5 | $Y_2O_3$ |
| 45 | 37–43 | $Y_2O_3$ |
| 50 | 37–42 | $Y_2O_3$ |
| 53 | 37–41 | $Y_2O_3$ |
| 55 | 38–40 | $Y_2O_3$ |
| 57 | 39 | $Y_2O_3$ |

Within the most preferred embodiment of the invention the ratio of $Y_2O_3$:$La_2O_3$=1:4, and at this ratio optimum stability is obtained. The line corresponding to this ratio of $Y_2O_3$:$La_2O_3$ appears on the drawing and is so labeled. Due to the high price of $Y_2O_3$ it is often desirable to use a lesser amount of $Y_2O_3$, and glass compositions containing ratios of $Y_2O_3$:$La_2O_3$ of 1:6 or even 1:7 have proven highly suitable and much less expensive due to the lower content of $Y_2O_3$. A line is also indicated on the graph showing a $Y_2O_3$:$La_2O_3$ ratio of 1:6. The most preferred glass compositions in accordance with the invention fall within the encircled area on the graph between the 1:6 and 1:4 lines.

While preferably the glasses in accordance with the invention consist solely of the three components indicated, it is also possible to add other materials to the glass, such as refraction-increasing oxides as $Ta_2O_5$, $ZrO_2$, and $CdO$. Such materials, however, should only be present in small quantities, as for example up to 5 grams per 100 grams of the starting material, otherwise the Abbe value will decrease.

In principle it is possible, in accordance with the invention, to use the $La_2O_3$—$Y_2O_3$ mixture where, at extremely high lanthium contents, the crystallization tendency of the glass becomes brittle.

As raw materials for the production of the glasses in accordance with the invention there is preferably used the commercially available lanthium oxide and yttrium oxide. It is preferable that the yttrium oxide does not contain other oxides which might discolor the melt, and the presence of such other discoloring oxides may be most simply, empirically determined with the use of a small test melt of, for example, 50 grams. The boric oxide is preferably added as boric acid hydrate $B(OH)_3$, which is readily commercially obtainable as a substantially pure material. The amount, i.e. the percentage of the boric acid, is based on the anhydrous $B_2O_3$, and the analysis thus shows values which are smaller by around 0.5% by weight. The material may have a small moisture content and carbon dioxide content as is inherently present due to the action of the ambient environment after, for example, storage in glass-stoppered bottles or plastic containers in the customary manner.

In addition to the above mentioned oxides, the conventional purification agents as, for example, $As_2O_3$, in quantities of about 0.5% by weight, may be used. The materials may be used without special comminution as for example in the physical form conventionally used for analysis. The materials are simply added to the melting crucible with no particular care being necessary, as the melt becomes so highly fluid that it may be easily homogenized by stirring during the melting process. In the case of larger batches it may be desirable to appropriately mix the materials, using a commercial mixing machine before addition to the crucible.

The melting is effected in the conventional manner for lanthium borate glasses, as for example described in United States Patents 2,434,148, 2,861,000, 2,866,712, 2,466,392, 2,584,974 and 2,466,510. The melting is most preferably effected in a platinum crucible which is heated to about 1250° C., and which in connection with larger melting units, may sit in a protective crucible of sintered aluminum oxide. When using larger crucibles it is preferable not to load the same to a heigh of more than about 3 cm. in order to effect the best and most reliable melting.

The heating of the crucible may be effected in any conventional manner, as for example inductively, in a furnace, with the use of platinum electrodes, etc.

After the crucible has been charged with the melt to the desired height, as for example up to 3 cm. below the rim in crucibles of 15 cm. diameter, the temperature is raised for the purpose of purification by around 100° C. In melts of about 2 kg. this purification takes about 1 hour. Thereupon the melt is stirred with a platinum stirrer, as for example with a speed of about 100 to 200 revolutions per minute. During the stirring the temperature is reduced to about 1000° C., which may be determined using an optical pyrometer. As the temperature decreases the stirring speed simultaneously decreased by about 50%. During the stirring it is preferable to cover the crucible with an insulating cover in order to prevent surface crystallization. It is also preferable to terminate the cooling for several minutes without stirring and then pour the melt into a form pre-heated to about 300° C., which may for example be formed of 2 mm. thick, scale-free steel. The filled form is then slid into a cooling oven, and the temperature decreased at a rate of about 10° per hour. The primary purpose of this pre-cooling is to prevent cracks from forming during the cooling, or stresses from occurring which will cause bursting during subsequent sawing or grinding. After complete cooling to normal temperature the glass pieces are taken out of the cooling oven and may be converted into the desired form for further processing by sawing, breaking, grinding or the like. Additionally, pieces may be tested as to their properties, as for example blowing, refraction, etc.

The glass thus obtained may be designated as an optical crude glass and may be marketed as such. The subsequent treatment depends largely on the intended use, and it is generally not effected by the glass-maker but by the producer, who may, for example, reheat the same, followed by a fine-cooling and annealing, shaping through hot-pressing, etc.

Alternatively, the production may be effected so that the cooling operation is effected as a fine-cooling in the conventional manner, or in which the glass, still in the liquid state, is molded, etc.

The invention, however, is not concerned with the specific treatment of the glass for any particular purpose but in the production of a glass substance of a specific composition having remarkable light-refraction properties.

The invention will be explained in further detail in the following examples which are given by way of illustration and not limitation:

EXAMPLE 1

101 grams of commercial lanthium oxide (99% $La_2O_3$), 26 grams of yttrium oxide, 131 grams of boric acid hydrate and 1 gram of $As_2O_3$, all having a particle size between about 0.1–0.2 mm. were mixed together for 5 minutes by shaking in a glass-stoppered bottle. The mixture was charged by means of a porcelain spoon into a platinum crucible having a ½ mm. wall thickness, 100 mm. height and 40 mm. diameter. The crucible is positioned on a ceramic plate and lowered into an oven having a temperature of about 1250° C. After the entire quantity has melted, the temperature is raised by about 100° C. for refining, and dissolved gas escapes and the melt becomes substantially free from bubbles. The temperature may be determined through an opening in the oven cover, using an optical pyrometer. The melt is maintained at this increased temperature for about 15 minutes and then a platinum vane stirrer is introduced into the melt and rotated at about 200 revolutions per minute. The heating is decreased during the stirring so that after about 20 minutes the temperature has decreased to about 1000° C. The stirring velocity is, however, decreased to about 100–150 revolutions per minute when the temperature reaches 1050° C. The crucible is then taken out of the oven with crucible tongs for a minute, carefully swung so that a gentle, circular motion of the liquid glass occurs, and the crucible contents are then poured from as low as possible a height into a mold of 100 mm. length and 30 mm. width, formed of 2 mm. thick, scale-free steel, which had been rubbed with talc and preheated to about 300° C. The mold with the melt is slid into a cooling oven, whose temperature is around 600° C. and thereupon the oven is cooled at a rate of about 10° C. an hour. The cooled glass obtained may be immediately worked up into small lenses.

EXAMPLE 2

Glasses having the composition indicated in the following table are produced in the manner described in Example 1. These glasses are indicated as points in the three-component graph of the drawing:

Table

| $B_2O_3$ | $La_2O_3$ | $Y_2O_3$ | $n_d$ | $\nu_d$ |
|---|---|---|---|---|
| 37 | 53 | 10 | 1.7506 | 53.55 |
| 37 | 50 | 13 | 1.7487 | 53.52 |
| 40 | 52 | 8 | 1.7303 | 54.74 |
| 39 | 49 | 12 | 1.7439 | 53.66 |
| 40 | 46 | 14 | 1.7273 | 54.63 |
| 40 | 42 | 18 | 1.7301 | 54.53 |

While the invention has been described in detail with reference to certain specific embodiments, various changes and modifications will become apparent to the skilled artisan which fall within the spirit of the invention and scope of the appended claims. The invention is therefore only intended to be limited by the appended claims or their equivalents wherein I have endeavored to claim all inherent novelty.

I claim:

1. An optical glass having a high refractive index of $n_d$ 1.715–1.76 and a high Abbe value $\nu$, essentially consisting of $B_2O_3$, $La_2O_3$ and $Y_2O_3$ in amounts falling within the encircled area of the three-component graph of the accompanying drawing, the remainder, if any, consisting of one or more oxides of the group of silica, alumina, high refracting oxides $ZrO_2$, $Ta_2O_5$, $Nb_2O_5$, CdO, the sum of these oxides not exceeding 5% by weight.

2. An optical glass according to claim 1 in which the amounts of $B_2O_3$, $La_2O_3$ and $Y_2O_3$ fall within the area of the three-component graph of the accompanying drawing as defined by the coordinates of the following table:

| $La_2O_3$, Weight Percent | $B_2O_3$, Weight Percent | Remainder |
|---|---|---|
| 40 | 39–41 | $Y_2O_3$ |
| 42 | 38–42.5 | $Y_2O_3$ |
| 45 | 37–43 | $Y_2O_3$ |
| 50 | 37–42 | $Y_2O_3$ |
| 53 | 37–41 | $Y_2O_3$ |
| 55 | 38–40 | $Y_2O_3$ |
| 57 | 39 | $Y_2O_3$ |

3. An optical glass according to claim 1 in which said $Y_2O_3$ is present in amount of about ¼ to ⅙ the amount of $La_2O_3$.

References Cited by the Examiner

UNITED STATES PATENTS

| Re. 21,175 | 8/39 | Morey | 106—47.0 |
| 2,456,033 | 12/48 | Sun | 106—47 |
| 3,080,240 | 3/63 | Geffcken et al. | 106—47 |
| 3,081,178 | 3/63 | Weissenberg et al. | 106—47 |

TOBIAS E. LEVOW, *Primary Examiner.*

JOHN R. SPECK, *Examiner.*